May 3, 1932.   A. PETERSON   1,856,588
TRAFFIC SIGNAL SWITCH
Filed Aug. 5, 1929
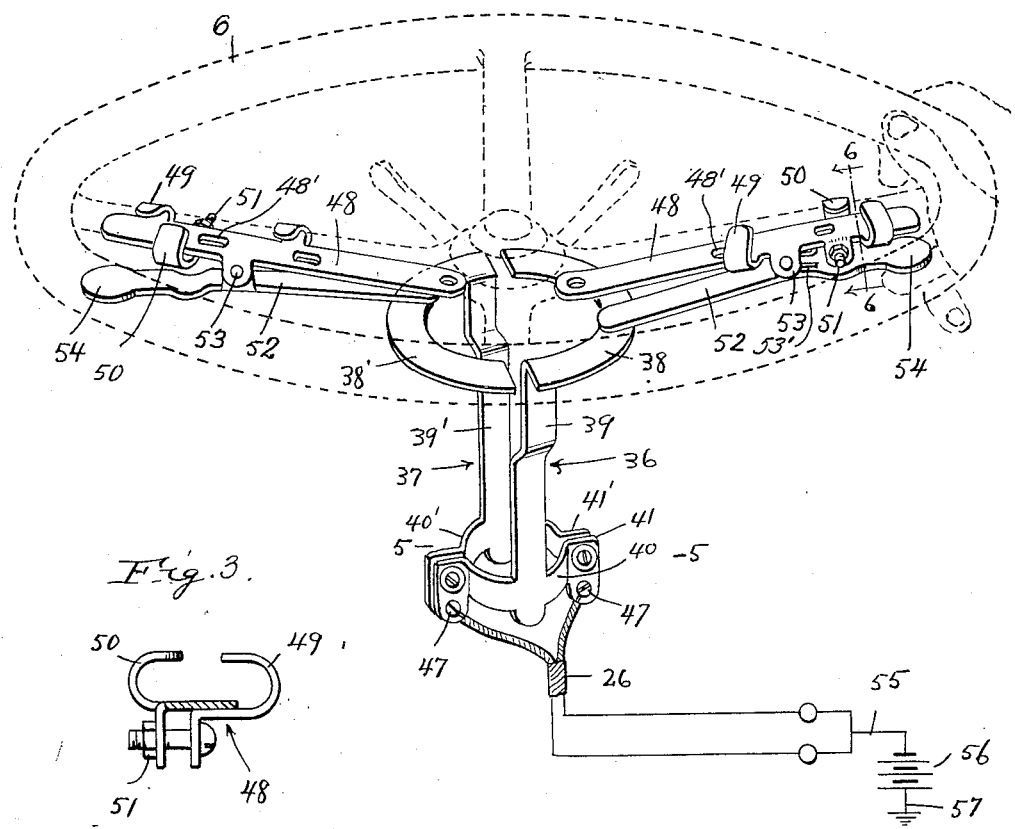
Inventor
Albert Peterson
By Clarence A. O'Brien
    Attorney Patented May 3, 1932

1,856,588

UNITED STATES PATENT OFFICE

ALBERT PETERSON, OF WASHBURN, NORTH DAKOTA

TRAFFIC SIGNAL SWITCH

Application filed August 5, 1929. Serial No. 383,560.

This invention relates to a switch for signalling devices for vehicles such as automobiles and the like, whereby the operator of the vehicle may readily warn the operators of vehicles approaching him either from the rear or from the front, as to the direction of travel of the vehicle equipped with the signal.

The invention further comprehends the provision of a switch mechanism adapted to be placed upon the steering wheel so as to be conveniently operated by the driver for illuminating the proper signal.

Other objects and advantages of the invention will become apparent during a study of the following description, taken in connection with the accompanying drawings, wherein:

Figure 1 is an elevational view of my improved switch mechanism showing the same incorporated with the steering wheel and steering post of the vehicle.

Figure 2 is a horizontal transverse sectional view, taken substantially on the line 5—5 of Figure 1.

Figure 3 is a detail sectional view, taken substantially on the line 6—6 of Figure 1 and looking in the direction of the arrows.

From the drawings, it will be seen that attached to the steering post or column of the automobile or similar vehicle are two primary switch sections or members designated generally by the reference characters 36 and 37 respectively. These switch members 36 and 37 are exact duplicates in construction and it will be observed that each comprises a quadrant 38 and 38' respectively adapted to be disposed about the post 6' adjacent the hub of the steering wheel 6. At opposite ends, each of the said quadrants are provided with brackets 39 and 39' respectively which bracket arms extend longitudinally of the post 6' at opposite diametrical sides of the post and these arms terminate at their lower ends in arcuate shaped ends 40 and 40' respectively. Each of the arcuate ends of the bracket arms are provided with lateral ears 41 and 41' respectively, said ears being apertured to receive bolts 42, nuts 43 being threaded on the bolts for maintaining the arcuate ends of the bracket arms in clamped position about the steering post 6'. As shown to advantage in Figure 2, the apertures in the ears 40 are insulated as at 44.

The bracket arms 39 and 39' respectively are each offset intermediate their ends as at 45, so that the ends of the bracket arms adjacent the quadrants 38 are disposed in spaced relation with respect to the steering post 6', the remaining portion of the arm and arcuate ends 40 and 40' respectively being insulated from the steering post through the medium of tape or other suitable insulating material 46, wrapped about the post as shown to advantage in Figure 2. The conductor wires 26 leading from the bulbs 23 in the signal casing are electrically connected with the ears 41, as at 47. Thus it will be seen that the switch members 36 and 37 constitute the stationary contacts of my switch mechanism. Elongated bracket plates 48 are adapted to be secured to the under face of any two of the spokes of the steering wheel 6. These plates 48 are preferably disposed or associated with the spokes at diametrically opposite sides of the hub of the steering wheel. Each of the bracket plates 48 have formed integral therewith and at one longitudinal edge thereof hooks 49, which engage the spokes of the steering wheel along one side of the spoke. Hooks 50 are adjustably connected to these plates 48 as at 51 and these hooks 50 are adapted to engage the respective posts of the steering wheel on opposite sides of the post, thus cooperating with the hooks 49, for maintaining the bracket plates 48 in a stationary position upon the spokes of the steering wheel. Each of the bracket plates 48 are also further provided with slots 48' formed therein and through which slots and the spokes of the steering wheel small bolts may be passed for detachably securing the bracket plates 48 to their respective spokes. Movable contact members 52 which contact members 52 are in the nature of levers, being of elongated construction, are hingedly connected to each of the bracket plates 48, to the under face of the bracket plate through the medium of spring hinges 53 the springs of which are shown at 53'. Thus it will be seen that these movable contact members 52, being disposed in operative relation to the quadrants 38 and 38' respectively are adapted to have one end moved into and out of contact with the respective quadrant. The spring hinges 53 normally maintain said ends of the movable contact up against the under face of the face 48, out of contact with these quadrants. At their opposite ends the movable contact levers 52 are provided with finger engaging surfaces or heads 54, which heads are disposed adjacent the rim of the steering wheel, so that the hands of the operator gripping the wheel may be disposed on the wheel adjacent each movable contact member.

Obviously, therefore, the lights 23 in a signal casing may be selectively illuminated by the operator by merely pressing upwardly against the outer end of the contact member 52 so as to depress the opposite end of the contact into engagement with the stationary contact or quadrant 38, thus completing the circuit to that lamp 23 the circuit of which is to be closed.

Wires 26 from the switch to the bulbs are jointly connected by a wire 55, to one side of the battery 56. The battery 56 is ground on its negative side as at 57.

The spring contacts 52 attached to the under side of the spokes of the steering wheel will, of course, ground the circuit through the frame of the car by way of the steering wheel column.

Obviously then, when the operator of the vehicle contemplates a turn in one direction, the operator manually actuates the proper movable switch contact member 52, to bring the same into contact with the stationary contact or quadrant 38, so that the desired light will be illuminated. The operator may then rotate the steering wheel for making the contemplated turn, and upon release of that movable contact merely by moving his finger from the end of the contact, the end of the movable contact will spring up against its plate 48 out of engagement with the quadrant 38 or 38' as the case may be, thus breaking the circuit to the bulb and consequently putting out the previously lighted lamp.

In view of the simplicity of the device, it is believed that a clear understanding of the construction, operation, and advantages of a device of this nature will be clearly understood from the foregoing description, taken in connection with the accompanying drawings, by those skilled in this art.

What is claimed as new is:

In a signalling system for motor vehicles, a sectional clamp for engaging the steering column of the vehicle, means for insulating the sections of the clamp from each other and from the column, an upright on each section, a flat semi-circular contact member connected to the upper end of each upright, a pair of elongated plates each having tongues thereon for engaging a spoke of the steering wheel, depending ears on each plate, a finger lever having upwardly extending ears thereon, means for pivotally connecting the ears of each lever to the ears of each plate, the outer end of each lever having a finger engaging part thereon, spring means for normally holding each lever in a position with its inner end out of engagement with the semi-circular contact member but said inner end engaging the contact member when the outer end of the lever is pushed upwardly.

In testimony whereof I affix my signature.

ALBERT PETERSON.